US010070636B2

United States Patent
Niitsuma

(10) Patent No.: US 10,070,636 B2
(45) Date of Patent: Sep. 11, 2018

(54) SPOOL BRAKE DEVICE FOR DUAL-BEARING REEL

(71) Applicant: Shimano Inc., Sakai, Osaka (JP)

(72) Inventor: Akira Niitsuma, Osaka (JP)

(73) Assignee: SHIMANO INC., Sakai, Osaka (JP)

( * ) Notice: Subject to any disclaimer, the term of this patent is extended or adjusted under 35 U.S.C. 154(b) by 327 days.

(21) Appl. No.: 15/059,569

(22) Filed: Mar. 3, 2016

(65) Prior Publication Data
US 2016/0309690 A1  Oct. 27, 2016

(30) Foreign Application Priority Data

Apr. 27, 2015 (JP) ................................ 2015-090727

(51) Int. Cl.
*A01K 89/01* (2006.01)
*A01K 89/0155* (2006.01)
*A01K 89/033* (2006.01)

(52) U.S. Cl.
CPC ...... *A01K 89/01557* (2015.05); *A01K 89/033* (2013.01)

(58) Field of Classification Search
CPC ..................... A01K 89/0155; A01K 89/01557
See application file for complete search history.

(56) References Cited

U.S. PATENT DOCUMENTS

| 8,985,492 B2 * | 3/2015 | Niitsuma | A01K 89/0155 |
| | | | 242/289 |
| 2012/0248233 A1 * | 10/2012 | Saito | A01K 89/0155 |
| | | | 242/289 |
| 2013/0181081 A1 * | 7/2013 | Niitsuma | A01K 89/0155 |
| | | | 242/289 |
| 2014/0374524 A1 * | 12/2014 | Takechi | A01K 89/033 |
| | | | 242/289 |

FOREIGN PATENT DOCUMENTS

| GB | 809014 A | * | 2/1959 | ......... A01K 89/0155 |
| JP | 2014176360 A | * | 9/2014 | ......... A01K 89/0155 |
| JP | 2014233260 A | | 12/2014 | |

* cited by examiner

*Primary Examiner* — Emmanuel M Marcelo
(74) *Attorney, Agent, or Firm* — United IP Counselors, LLC

(57) ABSTRACT

The present spool brake device is configured to brake a spool, rotatably mounted to a reel unit, by a centrifugal force. The present spool brake device includes a rotary member, a brake drum and a brake shoe. The rotary member is configured to be rotated in conjunction with a rotation of the spool. The brake drum is disposed in an alignment with the spool along a rotational axis of the spool and is mounted to the reel unit. The brake shoe is contactable to an outer periphery of the brake drum and is pivotably supported by the rotary member, with a center of gravity of the brake shoe being located radially outside the brake drum.

17 Claims, 8 Drawing Sheets

SPOOL BRAKE DEVICE FOR DUAL-BEARING REEL

CROSS-REFERENCE TO RELATED APPLICATIONS

This application claims priority to Japanese Patent Application No. 2015-090727, filed on Apr. 27, 2015, the entirety of which is hereby incorporated by reference in its entirety.

BACKGROUND

Technical Field

The present description relates to a spool brake device for a dual-bearing reel, and particularly to a spool brake device configured to brake a spool rotatably mounted to a reel unit by a centrifugal force.

Background Information

In general, a type of dual-bearing reel used for casting is configured to apply a braking force to a spool in order to prevent an occurrence of backlash. Among spool brake devices for this type of dual-bearing reel, a well-known spool brake device is configured to brake the spool by utilizing a centrifugal force produced in a rotation of the spool, and simultaneously, is capable of regulating a force to brake the spool.

Japan Laid-open Patent Application Publication No. 2014-233260 describes an exemplary well-known spool brake device configured to make brake shoes pivot and make them contact to a brake drum in order to apply a braking force to the spool. In the well-known spool brake device, the brake shoes are configured to pivot in conjunction with a rotation of the spool and are configured to make contact with the brake drum.

Specifically, the brake shoes pivot and make contact with the brake drum in a condition that the center of gravity of each brake shoe is disposed between the brake drum and a flange of the spool along a spool shaft.

In the well-known spool brake device, the brake shoes pivot in the condition that the center of gravity of each brake shoe is disposed between the brake drum and the flange of the spool along the spool shaft. Therefore, it is required to prepare a space for enabling the brake shoes to pivot between the brake drum and the flange of the spool in the direction of the spool shaft. This brings a drawback that an increase in an axial size of a dual-bearing reel is inevitable when the dual-bearing reel is designed to be equipped with the well-known spool brake device.

BRIEF SUMMARY

The present description has been produced in view of the aforementioned drawback. It is an object of the present description to provide a spool brake device whereby a dual-bearing reel can be produced in an axially small size.

(1) A spool brake device for a dual-bearing reel according to an aspect of the present description is configured to brake a spool, rotatably mounted to a reel unit, by a centrifugal force. The present spool brake device includes a rotary member, a brake drum and a brake shoe. The rotary member is configured to be rotated in conjunction with a rotation of the spool. The brake drum is disposed in an alignment with the spool along a rotational axis of the spool, and is mounted to the reel unit. The brake shoe is contactable to an outer periphery of the brake drum, and is pivotably supported by the rotary member, with a center of gravity of the brake shoe being located radially outside the brake drum.

In the present spool brake device, the brake shoe is configured to pivot, with the center of gravity thereof being located radially outside the brake drum. Accordingly, the brake drum can be disposed adjacent to the spool in a direction along the rotational axis of the spool. In other words, even when the spool brake device is mounted to the dual-bearing reel, the dual-bearing reel can be produced in an axially small size.

(2) In a spool brake device for a dual-bearing reel according to another aspect of the present description, it is further preferable that the brake shoe has a pivot center located radially outside the brake drum.

In this aspect, in addition to the aforementioned construction, the pivot center of the brake shoe is located radially outside the brake drum. Hence, the dual-bearing reel can be produced in an axially smaller size.

(3) In the spool brake device for a dual-bearing reel according to yet another aspect of the present description, it is further preferable that the brake shoe is configured to be restricted in pivoting such that the center of gravity thereof pivots in a range more separating from the spool than the pivot center thereof.

In this aspect, in addition to the aforementioned constructions, the pivot range of the center of gravity of the brake shoe is always restricted to a range more separating from the spool than the pivot center of the brake shoe. Hence, when the centrifugal force acting on the center of gravity ceases, the brake shoe can be smoothly returned to its initial posture.

Additionally, the brake shoe can be contacted to a spool-side position on the brake drum by moving the center of gravity of the brake shoe in the range more separating from the spool than the pivot center of the brake shoe. Accordingly, the protruding amount of the brake shoe toward the spool can be reduced in the direction along the rotational axis of the spool. In other words, the dual-bearing reel can be produced in an axially smaller size.

(4) In a spool brake device for a dual-bearing reel according to yet another further aspect of the present description, it is further preferable that the brake drum includes a taper part having a taper shape. Here, it is also preferable that the brake shoe includes a contact part to contact the taper part. Additionally, it is preferable that the contact part contacts the taper part from a small diameter side of the taper part.

Incidentally, in a well-known art, the contact part of the brake shoe contacts the taper part from a large diameter side of the taper part. In this configuration, there is a possibility that due to an elastic deformation of the contact part of the brake shoe or so forth, the contact position of the brake shoe is shifted to the small diameter side rather than as originally designed. Therefore, the well-known art has had a drawback that a braking force acting on the spool becomes larger than originally designed.

Compared to the well-known art, in the present spool brake device, the contact part of the brake shoe contacts the taper part of the brake drum from the small diameter side of the taper part. Accordingly, the dual-bearing reel can be produced in an axially smaller size, and simultaneously, the aforementioned drawback can be solved.

(5) In a spool brake device for a dual-bearing reel according to yet another further aspect of the present description, it is further preferable that a radial distance between the rotational axis of the spool and the center of gravity of the brake shoe is longer than a radial distance between the rotational axis of the spool and the pivot center of the brake shoe.

In this aspect, when the centrifugal force acts on the center of gravity of the brake shoe, the brake shoe can be caused to start pivoting about the pivot center smoothly and quickly.

(6) In a spool brake device for a dual-bearing reel according to yet another further aspect of the present description, it is further preferable that the rotary member includes a holder by which the brake shoe is non-pivotably held.

In this aspect, the brake shoe is non-pivotably held by the holder of the rotary member. Hence, the brake shoe can be arbitrarily set to be pivotable or non-pivotable. In other words, the magnitude of a braking force acting on the spool can be arbitrarily changed.

(7) In a spool brake device for a dual-bearing reel according to yet another further aspect of the present description, it is further preferable that the brake shoe includes a center-of-gravity part in which the center of gravity is located. Here, it is also preferable that the holder further restricts the center-of-gravity part from being contacted to the brake drum.

In this aspect, when the centrifugal force acting on the center-of-gravity part (center of gravity) of the brake shoe ceases and thereby the brake shoe returns to its initial posture, the holder can restrict the center-of-gravity part from being contacted to the brake drum.

(8) In a spool brake device for a dual-bearing reel according to yet another further aspect of the present description, it is further preferable that the rotary member includes a pivot shaft, by which the brake shoe is pivotably supported, and a hole, to which the pivot shaft is fitted.

In this aspect, the brake shoe can be easily mounted to the rotary member by fitting the pivot shaft to the hole of the rotary member.

Overall, according to the present description, it is possible to provide a spool brake device whereby a dual-bearing reel can be produced in an axially small size.

BRIEF DESCRIPTION OF THE DRAWINGS

Referring now to the attached drawings which form a part of this original disclosure.

DETAILED DESCRIPTION OF EMBODIMENTS

1. Entire Construction of Reel

Figure 1:
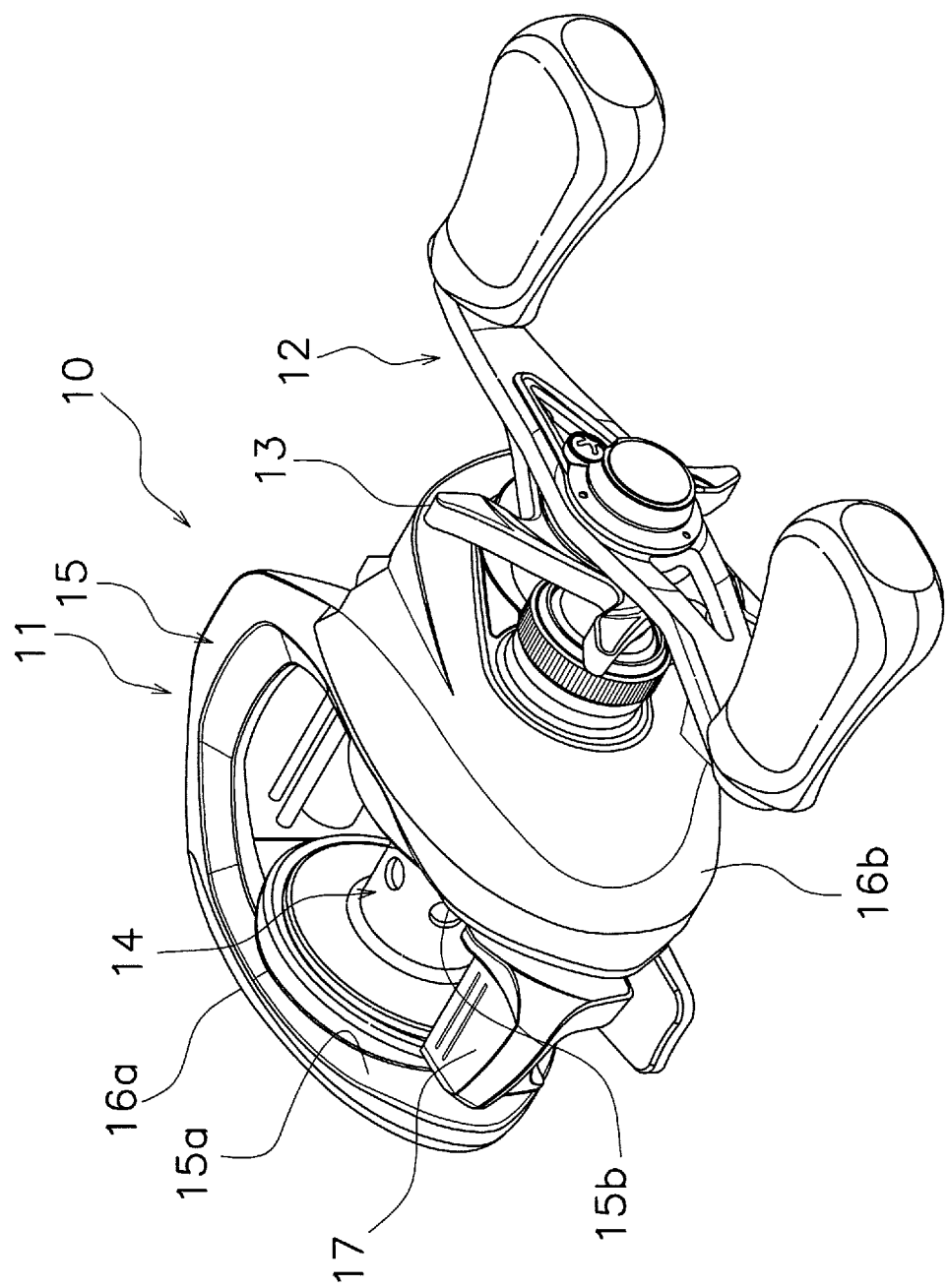
FIG. 1 is a perspective view of a dual-bearing reel according to a preferred embodiment of the present description.
Figure 2:
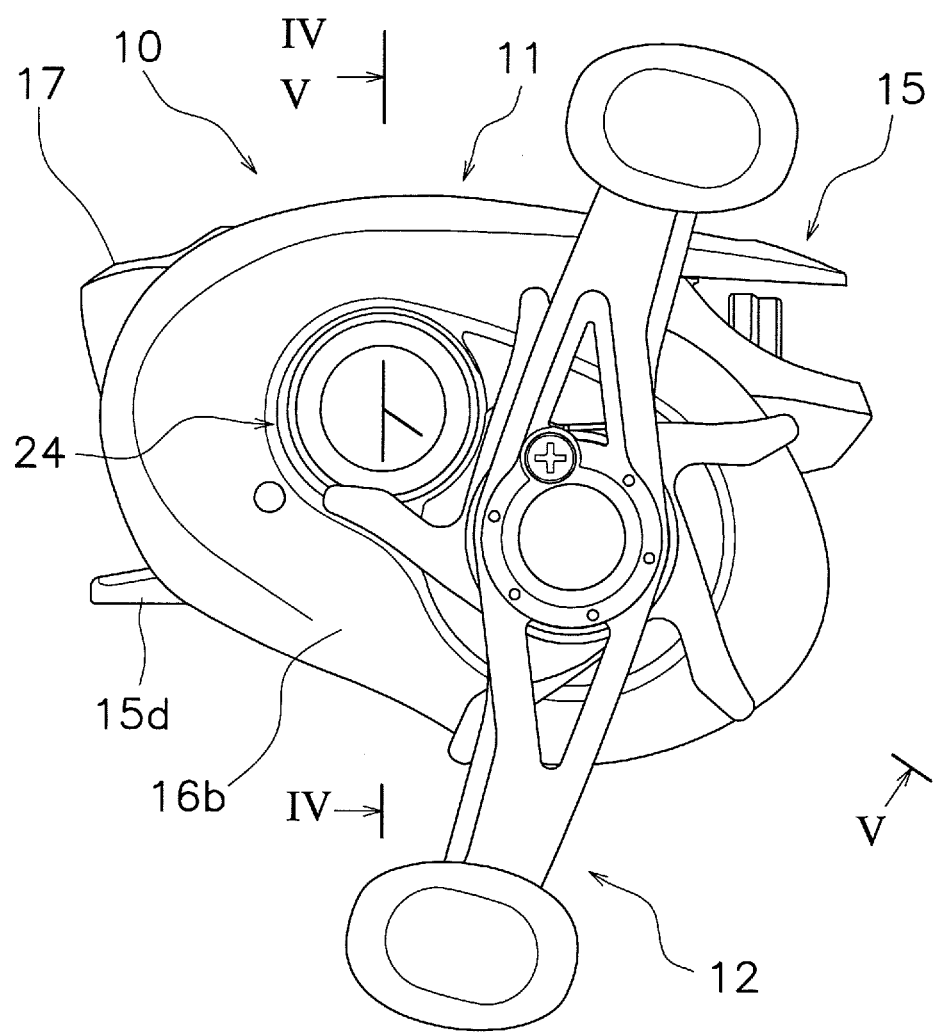
FIG. 2 is a right side view of the dual-bearing reel.
Figure 3:
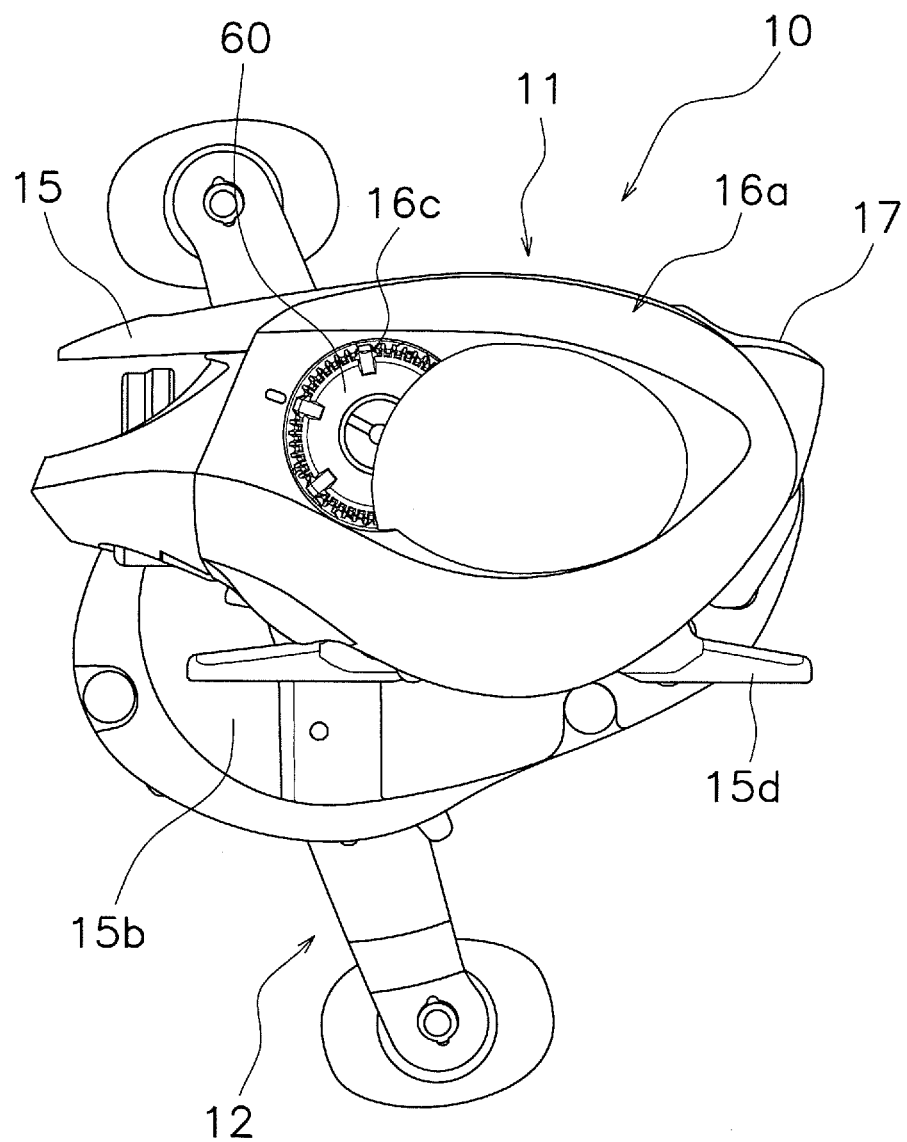
FIG. 3 is a left side view of the dual-bearing reel.

A dual-bearing reel 10 according to a preferred embodiment of the present description is a dual-bearing reel for bait casting. As shown in FIG. 1, the dual-bearing reel 10 includes a reel unit 11, a handle 12, a star drag 13, a spool 14, a spool shaft 20 (exemplary rotational axis of the spool 14, see FIGS. 4 and 5) to which the spool 14 is mounted, and a spool brake device 25 (see FIGS. 4 and 5).

The handle 12 is disposed laterally to the reel unit 11, and is configured to drive and rotate the spool 14. When described in detail, the handle 12 is non-rotatably mounted and fixed to a tip of a drive shaft 30. The handle 12 is disposed on the same side as a second side cover 16b to be described. The star drag 13 is configured to regulate a drag mechanism 23 to be described. The star drag 13 is disposed laterally to the reel unit 11. The star drag 13 is disposed between the handle 12 and the reel unit 11.

In the following explanation, the term "forward" and its related terms may be used for expressing a direction in which a fishing line is forwardly reeled out, whereas the term "rearward" and its related terms may be used for expressing a direction opposite to the direction in which the fishing line is forwardly reeled out. Additionally, the term "downward" and its related terms may be used for expressing a side on which the reel unit 11 is mounted to a fishing rod, whereas the term "upward" and its related terms may be used for expressing a side opposite to the side on which the reel unit 11 is mounted to the fishing rod.

Moreover, a direction in which the spool shaft 20 extends (i.e., the axial direction of the spool shaft) and a direction in which a pinion gear 32 extends (i.e., the axial direction of the pinion gear) are substantially the same. Therefore, the term "axial" and its related terms will be hereinafter used for expressing these directions.

Furthermore, the term "radial" and its related terms will be used for expressing a direction orthogonal to the spool shaft 20 and the pinion gear 32. More specifically, the term "radially outward" and its related terms will be used for expressing a direction that is orthogonal to the spool shaft 20 and the pinion gear 32, and simultaneously, separates from the spool shaft 20 and the pinion gear 32. On the other hand, the term "radially inward" and its related terms will be used for expressing a direction that is orthogonal to the spool shaft 20 and the pinion gear 32, and simultaneously, approaches to the spool shaft 20 and the pinion gear 32. Furthermore, the term "circumferential" and its related terms will be used for expressing a direction about the spool shaft 20 and the pinion gear 32.

2. Detailed Construction of Reel

The reel unit 11 is made of, for instance, a light metal such as magnesium alloy. As shown in FIGS. 1 to 6, the reel unit 11 includes a frame 15, first and second side covers 16a and 16b mounted to both sides of the frame 15, and a shaft strut portion 35. The spool 14 is rotatably mounted to the interior of the reel unit 11 through the spool shaft 20.

The frame 15 includes a first side plate 15a, a second side plate 15b and a plurality of (e.g., three) coupling portions 15c. The second side plate 15b is disposed in opposition to the first side plate 15a at a predetermined interval. The coupling portions 15c integrally couple the first side plate 15a and the second side plate 15b in front, rear and bottom positions. A fishing rod attachment portion 15d, to which the fishing rod is attached, is integrally formed with the bottom one of the coupling portions 15c.

The spool 14, a clutch operating member 17 for thumbing and a level wind mechanism 18 (see FIG. 5) for evenly winding the fishing line about the spool 14 are disposed in the interior of the frame 15.

Figure 4:
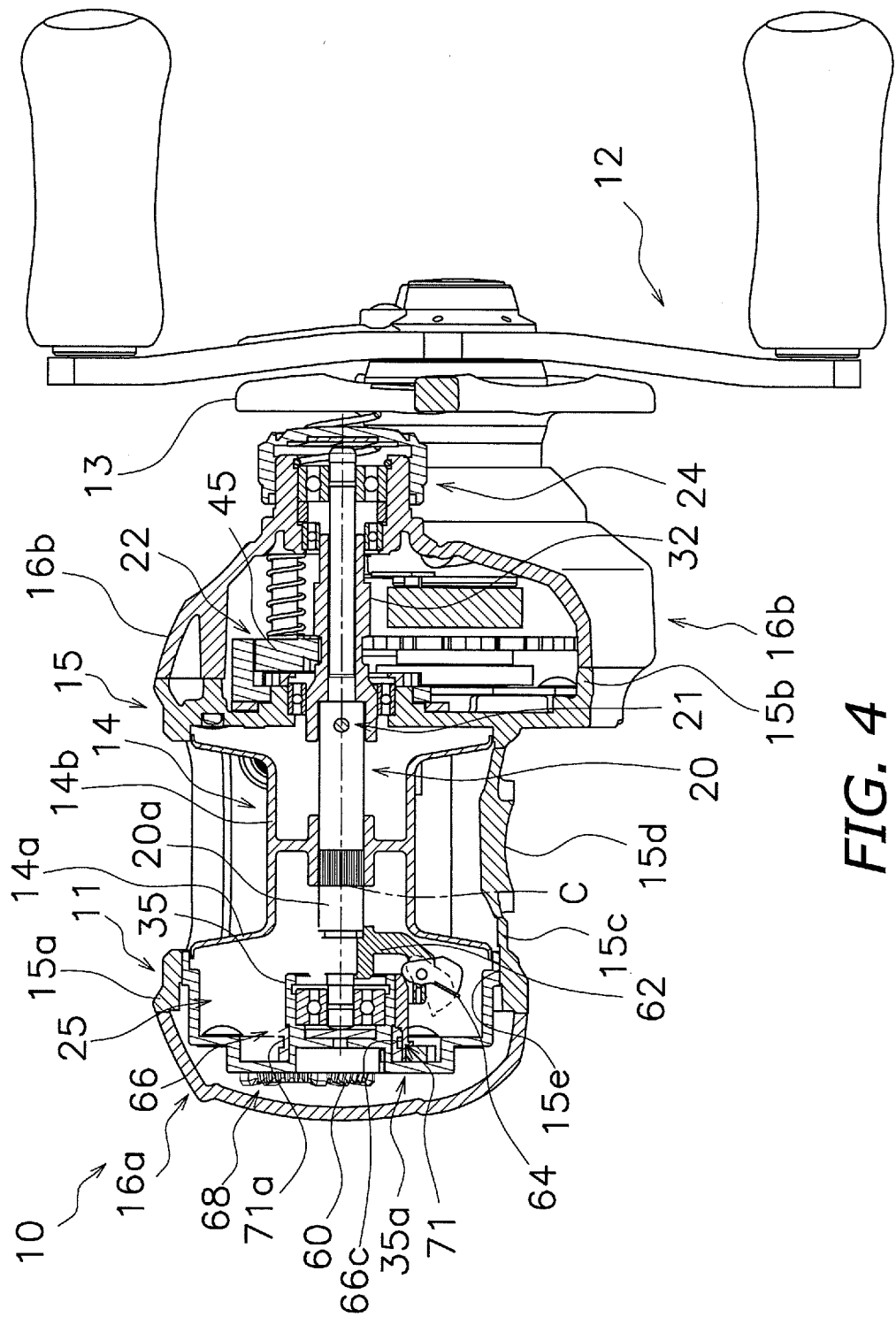
FIG. 4 is a cross-sectional view of FIG. 2 taken along cutaway line IV-IV.
Figure 5:
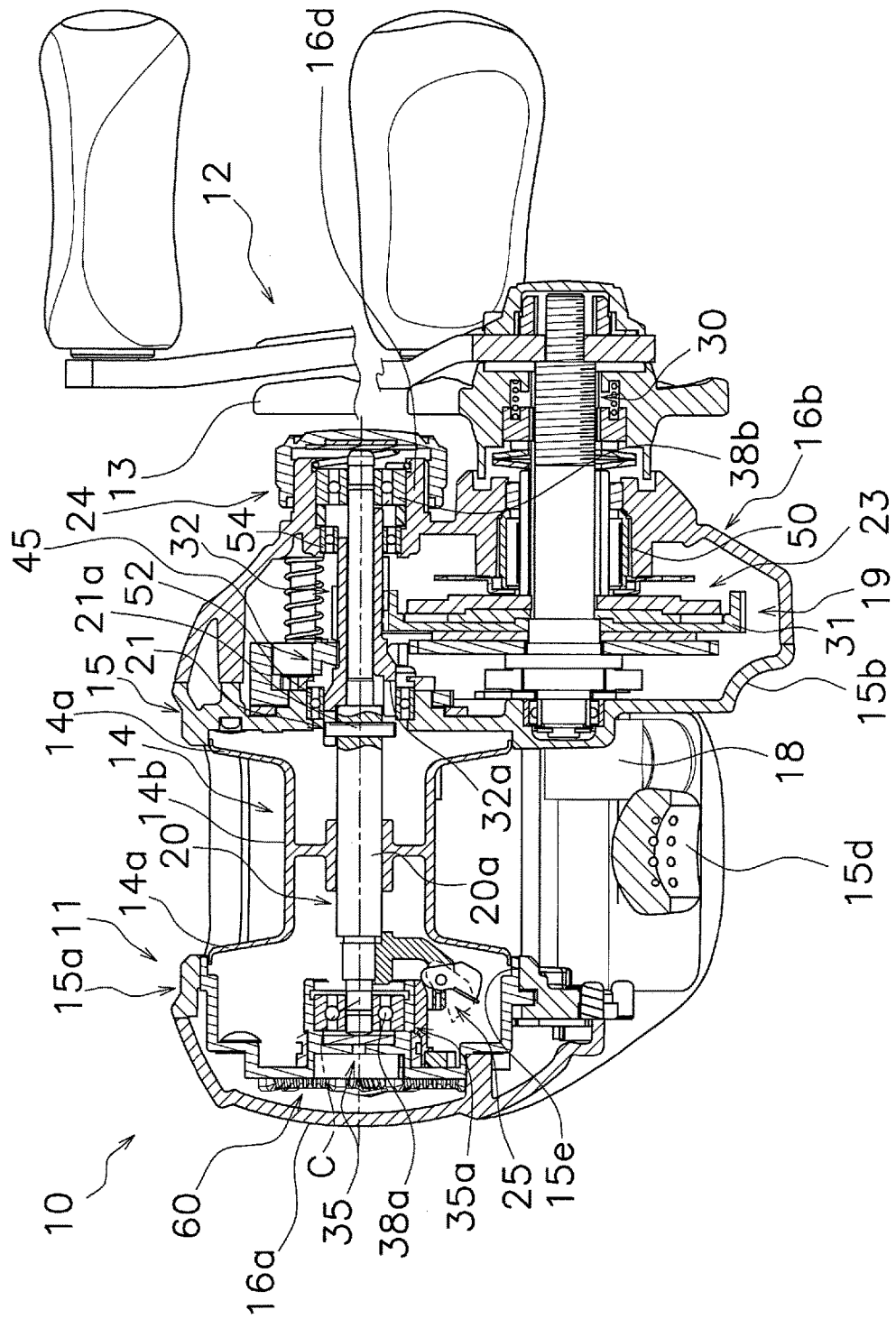
FIG. 5 is a cross-sectional view of FIG. 2 taken along cutaway line V-V.

As shown in FIGS. 4 and 5, a gear mechanism 19, a clutch mechanism 21, a clutch control mechanism 22, the drag mechanism 23 and a casting control mechanism 24 are disposed between the frame 15 and the second side cover 16b. The gear mechanism 19 is provided for transmitting a rotational force from the handle 12 to the spool 14 and the level wind mechanism 18. The clutch mechanism 21 is provided for coupling/decoupling the spool 14 and the handle 12 to/from each other. The clutch control mechanism 22 is provided for controlling the clutch mechanism 21 in response to an operation of the clutch operating member 17.

The drag mechanism 23 is provided for braking a rotation of the spool 14 when the fishing line is reeled out. A drag force of the drag mechanism 23 is regulated by the star drag 13. The casting control mechanism 24 is provided for regulating a resistive force to be applied during a rotation of the spool 14. The spool brake device 25 is disposed between the frame 15 and the first side cover 16a, and is configured to inhibit an occurrence of backlash in a casting by a centrifugal force.

As shown in FIGS. 1 to 5, the first side cover 16a is detachably mounted to the first side plate 15a, and covers the first side plate 15a from outside. The second side cover 16b is fixed to the second side plate 15b, and covers the second side plate 15b from outside.

Figure 6:
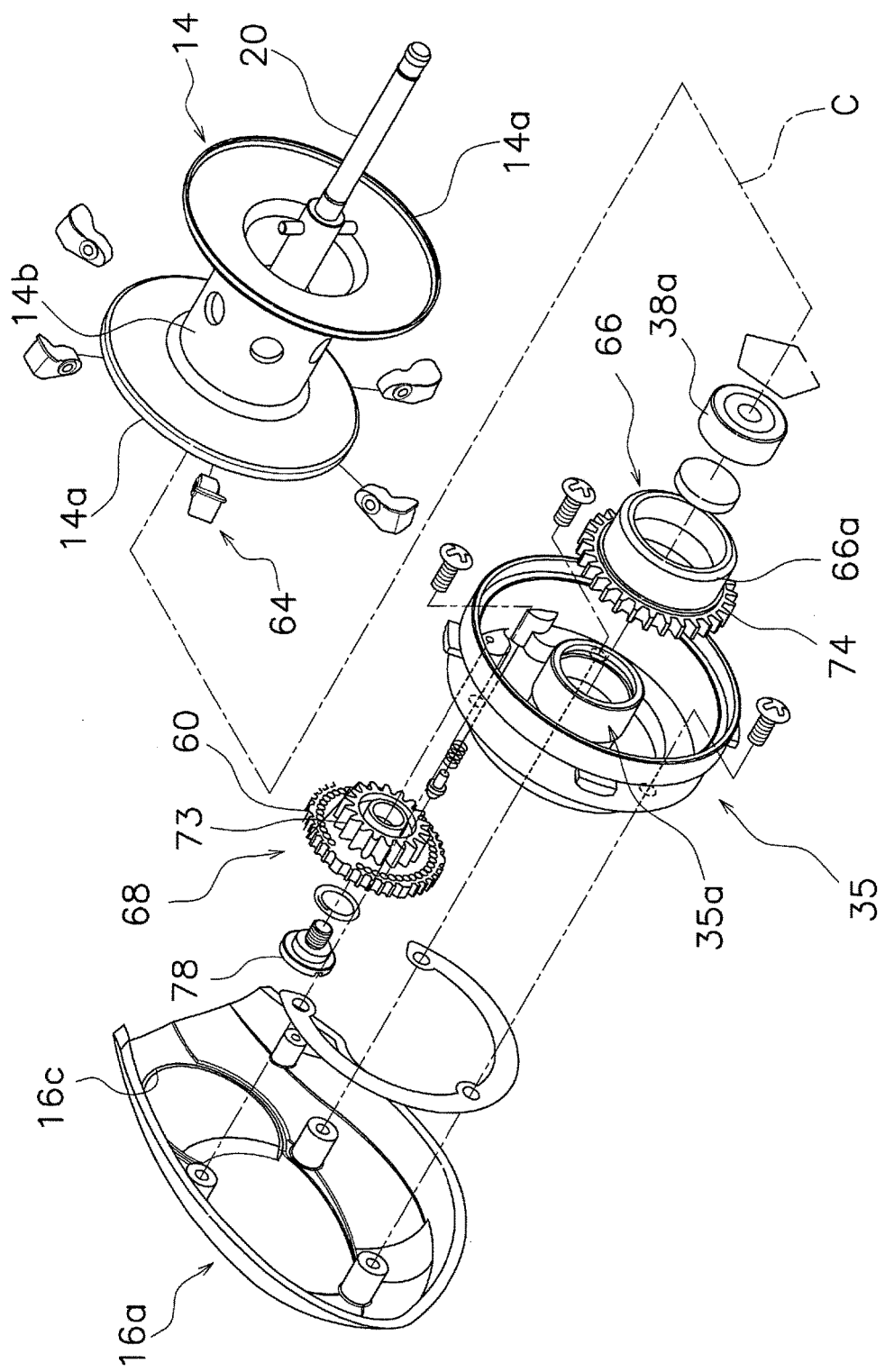
FIG. 6 is an exploded perspective view of a spool brake device.

The shaft strut portion 35 is provided for supporting the spool shaft 20. As shown in FIGS. 4 to 6, the shaft strut portion 35 is mounted to the frame 15. Specifically, as shown in FIG. 5, the shaft strut portion 35 is detachably coupled to an opening 15e of the first side plate 15a. As shown in FIGS. 5 and 6, the shaft strut portion 35 includes a bearing accommodating part 35a. The bearing accommodating part 35a has a substantially cylindrical shape. The bearing accommodating part 35a supports one end of the spool shaft 20 through a bearing 38a such that the one end of the spool shaft 20 is rotatable.

As shown in FIGS. 1, 4 and 5, the spool 14 is mounted between the first side plate 15a and the second side plate 15b. The spool 14 is rotatably supported by the reel unit 11. The spool 14 includes a pair of saucer-shaped flanges 14a on both lateral parts thereof and also includes a tubular bobbin trunk 14b between both flanges 14a. The spool 14 is fixed to the spool shaft 20 penetrating the inner peripheral side of the bobbin trunk 14b, and is unitarily rotatable therewith. For example, the spool 14 is fixed to the spool shaft 20 by serration coupling, and is unitarily rotatable therewith.

The spool shaft 20 is made of, for instance, a non-magnetic metal such as SUS304. The spool shaft 20 penetrates the second side plate 15b and extends to the outside of the second side cover 16b. The aforementioned one end of the spool shaft 20 (left end in FIG. 5) is rotatably supported by the bearing accommodating part 35a through the bearing 38a. The other end of the spool shaft 20 (right end in FIG. 5), extending to the outside of the second side cover 16b, is rotatably supported by a boss 16d formed on the second side cover 16b through a bearing 38b.

The spool shaft 20 includes a large diameter part 20a in the axially intermediate part thereof. The large diameter part 20a is provided with a clutch pin 21a forming a part of the clutch mechanism 21. The clutch pin 21a radially penetrates the large diameter part 20a in a position that the large diameter part 20a penetrates the second side plate 15b. Both ends of the clutch pin 21a protrude from the outer peripheral surface of the spool shaft 20.

As shown in FIG. 1, the clutch operating member 17 is disposed in a rear part of the space between the first side plate 15a and the second side plate 15b, and is disposed rearward of the spool 14. The clutch operating member 17 is coupled to the clutch control mechanism 22 (see FIG. 4). The clutch operating member 17 is slidable between the first side plate 15a and the second side plate 15b in both approaching and separating directions to and from the fishing rod attachment portion 15d (i.e., up-and-down direction). The clutch mechanism 21 is configured to be switched from a coupled state to a decoupled state or vice versa in conjunction with a slide operation of the clutch operating member 17.

As shown in FIG. 5, the gear mechanism 19 includes the drive shaft 30, a drive gear 31 fixed to the drive shaft 30, and the tubular pinion gear 32 meshed with the drive gear 31. The drive shaft 30 is rotatably mounted to the second side plate 15b and the second side cover 16b. The drive shaft 30 is prevented from (reversely) rotating by a roller-type one-way clutch 50 when the fishing line is reeled out. The roller-type one-way clutch 50 is mounted between the second side cover 16b and the drive shaft 30. The drive gear 31 is mounted to the drive shaft 30, and is unitarily rotatable therewith. When described in detail, the drive gear 31 is coupled to the drive shaft 30 through the drag mechanism 23.

As shown in FIG. 5, the pinion gear 32 penetrates the second side plate 15b, and extends in the axial direction. The pinion gear 32 is a tubular member of which the spool shaft 20 penetrates the center. The pinion gear 32 is mounted to the second side plate 15b through a bearing 52, and is rotatable and axially movable. Additionally, the pinion gear 32 is mounted to the second side cover 16b through a bearing 54, and is rotatable and axially movable. The pinion gear 32 includes an engaging groove 32a on one end thereof (left end in FIG. 5). The engaging groove 32a is configured to be engaged with the clutch pin 21a. The clutch pin 21a and the engaging groove 32a form the clutch mechanism 21.

The pinion gear 32 is configured to be moved to either a clutch-on position or a clutch-off position by the clutch control mechanism 22. It should be noted that the clutch-on position and the clutch-off position are simultaneously illustrated in FIG. 5. The clutch-on position is illustrated on the upper side of an axis C of the spool shaft 20 in FIG. 5, whereas the clutch-off position is illustrated on the lower side of the axis C of the spool shaft 20 in FIG. 5.

The clutch control mechanism 22 includes a clutch yoke 45 configured to move the pinion gear 32 along the axial direction. When the clutch operating member 17 is operated to a clutch-off operating position, the clutch yoke 45 is configured to move the pinion gear 32 to the aforementioned clutch-off position. Additionally, the clutch control mechanism 22 includes a clutch return mechanism (not shown in the drawings). The clutch return mechanism is configured to set the clutch mechanism 21 in a clutch-on state in conjunction with a rotation of the spool 14 in winding the fishing line about the spool 14.

3. Spool Brake Mechanism

The spool brake device 25 is configured to brake the spool 14 by a centrifugal force.

As shown in FIGS. 4 and 5, the spool brake device 25 is disposed in the reel unit 11. Specifically, the spool brake device 25 is mounted to the spool shaft 20 and the shaft strut portion 35. The spool brake device 25 includes a brake drum 66, a rotary member 62, a plurality of (e.g., six) brake shoes 64 and a moving mechanism 68.

3-1. Brake Drum

As shown in FIGS. 4 and 5, the brake shoes 64 are contactable to the brake drum 66. The brake drum 66 is disposed in the reel unit 11. Specifically, the brake drum 66 is disposed radially inward of the brake shoes 64. The brake drum 66 is mounted to the shaft strut portion 35 through a brake cam 71. Additionally, the brake drum 66 is disposed in axial alignment with the spool 14. It should be noted that the shaft strut portion 35 is mounted to the frame 15.

As shown in FIG. 6, the brake drum 66 includes a drum body 66a having a substantially cylindrical shape, a taper part 66b and a first gear part 74. The brake shoes 64 are contactable to the taper part 66b. The taper part 66b is formed on one end of the drum body 66a. The taper part 66b is disposed radially inward of the brake shoes 64. The taper part 66b has a taper shape and slants toward the spool 14. In other words, the taper part 66b is shaped such that the outer diameter thereof gradually reduces toward the spool 14.

The first gear part 74 is mounted to the other end of the drum body 66a. Specifically, the first gear part 74 is mounted to the drum body 66a, and is unitarily rotatable therewith. Additionally, the first gear part 74 protrudes radially outward from the other end of the drum body 66a. The first gear part 74 is meshed with a second gear part 73 (to be described).

3-2. Rotary Member

The rotary member 62 is a roughly circular member made of, for instance, a synthetic resin such as polyamide resin, polyacetal resin or so forth. The rotary member 62 is configured to be rotated in conjunction with a rotation of the spool 14. The rotary member 62 is coupled to the spool shaft 20 by an arbitrary suitable fixation method such as press fitting, and is unitarily rotatable therewith.

Figure 7:
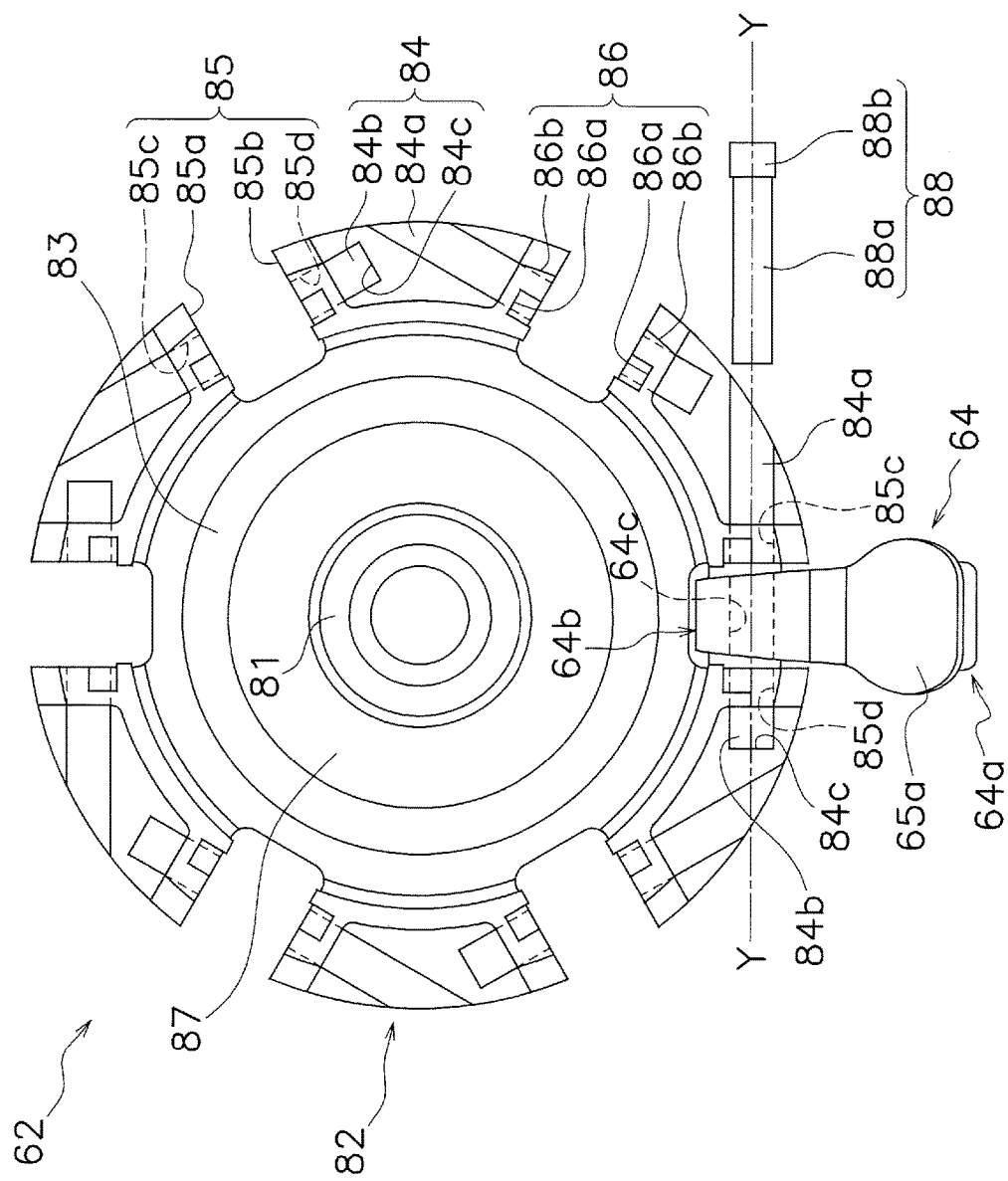
FIG. 7 is a front view of a brake shoe and a brake drum.
Figure 8:
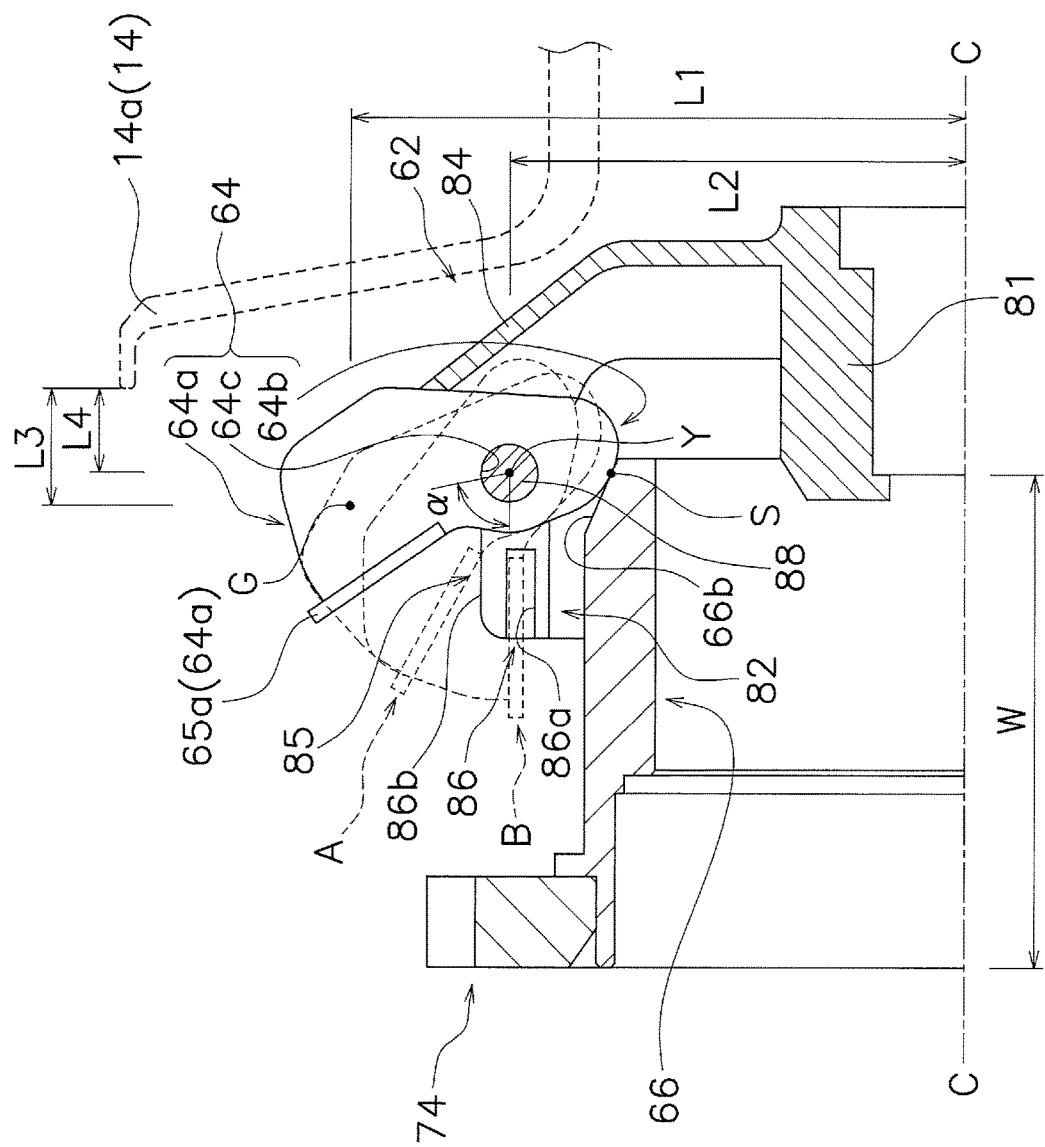
FIG. 8 is a partial enlarged cross-sectional view of the brake shoe and the brake drum.

Specifically, as shown in FIGS. 7 and 8, the rotary member 62 includes a boss part 81, a shoe attaching part 82, a connecting part 87 and a plurality of (e.g., six) pivot shafts 88. It should be noted that only one brake shoe 64 is illustrated in FIG. 7.

The boss part 81 has a tubular shape. The inner periphery of the boss part 81 is fixed onto the spool shaft 20.

The shoe attaching part 82 is provided radially outward of the boss part 81. The shoe attaching part 82 includes an attachment body 83, a plurality of (e.g., six) flanges 84, a plurality of (e.g., six) shoe mounts 85 and a plurality of (e.g., six) shoe holders 86.

The attachment body 83 has a substantially cylindrical shape. Each of the plural flanges 84 protrudes radially outward from the attachment body 83 and is provided between two circumferentially adjacent shoe mounts 85.

Each flange 84 includes first and second grooves 84a and 84b for guiding each pivot shaft 88. When described in detail, the first groove 84a guides each pivot shaft 88 to a first attachment hole 85c (to be described). The second groove 84b guides each pivot shaft 88 in a condition that each pivot shaft 88 passes through the first attachment hole 85c and a second attachment hole 85d (to be described). The second groove 84b includes a contact part 84c to which the tip of each pivot shaft 88 is contactable.

The shoe mounts 85 are parts in which the brake shoes 64 are disposed. The shoe mounts 85 are respectively disposed on the attachment body 83 while being circumferentially aligned at predetermined intervals. Each shoe mount 85 includes a pair of walls 85a and 85b circumferentially opposed to each other, and the first and second attachment holes 85c and 85d (e.g., exemplary holes) to which each pivot shaft 88 is mounted. The first and second attachment holes 85c and 85d are through holes. The first attachment hole 85c is formed in one of the pair of walls 85a and 85b (e.g., the wall 85a). The second attachment hole 85d is formed in the other of the pair of walls 85a and 85b (e.g., the wall 85b).

The shoe holders 86 hold the brake shoes 64 to prevent the brake shoes 64 from pivoting. Additionally, each shoe holder 86 restricts a center-of-gravity part 64a (to be described) of each brake shoe 64 from being contacted to the brake drum 66 (see FIG. 8).

Each shoe holder 86 is disposed in each shoe mount 85. Specifically, each shoe holder 86 protrudes from the pair of walls 85a and 85b of each shoe mount 85 in a direction separating from each pivot shaft 88. Each shoe holder 86 includes a pair of recesses 86a.

The recesses 86a of the pair are circumferentially opposed to each other (see FIG. 7) and extend in the direction separating from each pivot shaft 88 (see FIG. 8). A positioning part 65a (to be described) of each brake shoe 64 can be disposed in the pair of recesses 86a. Accordingly, each brake shoe 64 is non-pivotably held by each shoe holder 86.

Additionally, the center-of-gravity part 64a of each brake shoe 64 is contactable to an outer periphery 86b of each shoe holder 86. With the contact of the center-of-gravity part 64a of each brake shoe 64 to the outer periphery 86b of each shoe holder 86, the center-of-gravity part 64a is restricted from being contacted to the brake drum 66.

The connecting part 87 is a part connecting the boss part 81 and the shoe attaching part 82. The connecting part 87 is a thick disc-shaped member. The connecting part 87 is integrally formed with the boss 81, and is located on the outer peripheral side of the boss 81. Additionally, the attachment body 83 is integrally formed with the connecting part 87, and is located on the outer peripheral side of the connecting part 87.

The plural pivot shafts 88 respectively support the brake shoes 64 such that the brake shoes 64 are pivotable. The pivot shafts 88 are respectively mounted to the shoe mounts 85. Specifically, each pivot shaft 88 is mounted to the first and second attachment holes 85c and 85d of each shoe mount 85.

More specifically, each pivot shaft 88 includes a shaft part 88a and an enlarged diameter part 88b having a larger diameter than the shaft part 88a. The diameter of the shaft part 88a is smaller than the diameters of the first and second attachment holes 85c and 85d of each shoe mount 85. The diameter of the enlarged diameter part 88b is larger than that of the second attachment hole 85d of each shoe mount 85.

With that construction, when the shaft part 88a is inserted into the first and second attachment holes 85c and 85d along the first groove 84a, the tip of the shaft part 88a is guided by the second groove 84b and is contacted to the contact part 84c of the second groove 84b. Accordingly, the enlarged diameter part 88b is fitted to the first attachment hole 85c. In this condition, as described below, an axis Y of each pivot shaft 88 (i.e., a pivot center Y of each brake shoe 64) is disposed radially outside the brake drum 66 (see FIG. 8). Thus, the pivot shaft 88 is an example of a second disposing means for disposing a pivot center of the brake shoe radially outside the brake drum.

3-3. Brake Shoes

The brake shoes 64 are elastic members made of, for instance, a synthetic resin such as polyamide resin. When the rotary member 62 (the spool 14) is rotated, each brake shoe 64 pivots about the axis Y of each pivot shaft 88 by a centrifugal force acting on its center of gravity G.

As shown in FIGS. 4, 5 and 8, each brake shoe 64 is pivotably supported by each pivot shaft 88 of the rotary member 62, while its center of gravity is disposed radially outside the brake drum 66. Additionally, when pivoting by the centrifugal force, each brake shoe 64 is contactable to the outer periphery of the brake drum 66. Moreover, as described below, each brake shoe 64 is settable to a braking enabling posture and a braking disabling posture. The spool 14 can be braked when each brake shoe 64 takes the braking enabling posture. On the other hand, the spool 14 cannot be braked when each brake shoe 64 takes the braking disabling posture.

As shown in FIGS. 7 and 8, each brake shoe 64 has a substantially cuboid shape. Each brake shoe 64 includes the center-of-gravity part 64a, a contact part 64b and a hole 64c.

The center-of-gravity part 64a is a part in which the center of gravity G of each brake shoe 64 is set. When described in detail, the center-of-gravity part 64a is constructed such that each pivot shaft 88 (i.e., the axis Y of each pivot shaft 88) is disposed between the center-of-gravity part 64a (i.e., the center of gravity G of the center-of-gravity part 64a) and the contact part 64b (i.e., a contact surface S of the contact part 64b).

As shown in FIG. 8, the center of gravity G is herein set in the center-of-gravity part 64a. The center of gravity G of the center-of-gravity part 64a is disposed radially outside the brake drum 66 (e.g., on the upper side of the brake drum 66 in FIG. 8). In other words, when the brake drum 66 is seen from radially outside to radially inside (i.e., from the upper side of the brake drum 66 to the lower side thereof in FIG. 8), the center of gravity G of the center-of-gravity part 64a overlaps with the brake drum 66. Yet in other words, the center of gravity G of the center-of-gravity part 64a is disposed radially outside the brake drum 66 within an axial range of a width W of the brake drum 66. Thus, the center-of-gravity part 64a is an example of a first disposing means for disposing a center of gravity of the brake shoe radially outside the brake drum.

Additionally, in the radial direction, a distance L1 between the center of gravity G of the center-of-gravity part 64a and the axis C of the spool shaft 20 is longer than a distance L2 between the axis Y of each pivot shaft 88 (i.e., the pivot center Y of each brake shoe 64) and the axis C of the spool shaft 20. In other words, in the radial direction, the center of gravity G of each brake shoe 64 is moved in a positional range far more apart from the axis C of the spool shaft 20 than the axis Y of each pivot shaft 88.

Moreover, in the axial direction, a distance L3 between the center of gravity G of the center-of-gravity part 64a and an end of the spool 14 is longer than a distance L4 between the axis Y of each pivot shaft 88 (i.e., the pivot center Y of each brake shoe 64) and the end of the spool 14. In other words, the relation "L3>L4" is constantly established, and in the axial direction, the center of gravity G of each brake shoe 64 is moved in a positional range far more apart from the spool 14 than the axis Y of each pivot shaft 88.

The center-of-gravity part 64a is provided with the positioning part 65a. The positioning part 65a is contactable to and also engageable with the rotary member 62.

Specifically, as shown in FIGS. 7 and 8, the positioning part 65a has a substantially plate shape. The positioning part 65a partially protrudes from the center-of-gravity part 64a in opposite directions along the axis Y of each pivot shaft 88.

When each brake shoe 64 is herein pivotable, the positioning part 65a is contactable to the outer periphery 86b of each shoe holder 86 of the rotary member 62. The posture taken by each brake shoe 64 in this condition is the braking enabling posture (see broken line A in FIG. 8).

On the other hand, when the positioning part 65a is disposed in the pair of recesses 86a of each shoe holder 86 of the rotary member 62, each brake shoe 64 is held in a non-pivotable state. The posture taken by each brake shoe 64 in this condition is the braking disabling posture (see broken line B in FIG. 8).

The contact part 64b is a part of each brake shoe 64 and is to be contacted to the brake drum 66. The contact part 64b is an example of a restricting means for restricting the brake shoe in pivoting such that the center of gravity of the brake shoe pivots in a range more separating from the spool than a pivot center of the brake shoe separates from the spool. As shown in FIG. 8, the contact part 64b has a circular-arc shape. The contact part 64b is to be contacted to the taper part 66b of the brake drum 66 from the small diameter side (right side in FIG. 8) of the taper part 66b. The hole 64c is a part through which each pivot shaft 88 is inserted. The hole 64c is located between the center-of-gravity part 64a and the contact part 64b. The hole 64c is bored in a direction skew to the spool shaft 20 (i.e., skew to the axis C of the spool shaft 20).

3-4. Moving Mechanism

The moving mechanism 68 positions the brake shoes 64 and the brake drum 66 in the axial direction of the spool shaft 20 in a condition that the brake shoes 64 and the brake drum 66 are movable relatively to each other. As shown in FIGS. 4 and 6, the moving mechanism 68 includes an operating member 60, the brake cam 71, the first gear part 74 and the second gear part 73 (see FIG. 6).

The operating member 60 is a circular knob made of, for instance, a synthetic resin. The operating member 60 is disposed in an opening 16c bored in the first side cover 16a, and is exposed to the outside from the first side cover 16a (see FIG. 3). As shown in FIG. 6, the operating member 60 is rotatably supported on the outer surface of the shaft strut portion 35 through a fixation member such as a screw member 78. The first gear part 74 is disposed unitarily rotatably with the brake drum 66. The second gear part 73 is disposed unitarily rotatably with the operating member 60. The second gear part 73 is meshed with the first gear part 74.

As shown in FIG. 4, the brake drum 66 is engaged with the shaft strut portion 35 through the brake cam 71. The brake cam 71 is non-rotatably fixed to the outer peripheral surface of the shaft strut portion 35. The brake cam 71 includes a helical cam groove 71a. The brake cam 71 (i.e., the cam groove 71a) is engaged with a plurality of cam protrusions 66c formed on and protruding from the inner peripheral surface of the brake drum 66.

With that construction, when the operating member 60 is operated and rotated in one direction, the brake drum 66 is configured to be moved in a direction approaching to the spool 14, and a braking force is gradually strengthened. By contrast, when the operating member 60 is operated and rotated in the other direction (i.e., opposite to the aforementioned one direction), the brake drum 66 is configured to be moved in a direction separating from the spool 14, and the braking force is gradually weakened.

4. Action of Spool Brake Device 4-1. Overview of Action of Spool Brake Device

In the spool brake device 25, when the operating member 60 is located in an operation starting position, the contact part 64b of each brake shoe 64 is contacted to a small diameter side position on the taper part 66b of the brake drum 66. Accordingly, the dual-bearing reel 10 can be produced in an axially smaller size, and simultaneously, a braking force can be stably produced. Thus, the contact part 64b is an example of a means for stably producing a braking force. In this case, a pivot angle a of each brake shoe 64 is maximized. Accordingly, a force of the brake drum 66 pressing the brake shoes 64 is minimized, and a braking force acting on the spool 14 is minimized. It should be noted that FIG. 8 exemplifies a condition that the pivot angle a of each brake shoe 64 is maximized.

Next, when the operating member 60 is operated and rotated from the operation starting position, the second gear part 73 is rotated. In conjunction with this, the first gear part 74 meshed with the second gear part 73 is rotated, and thereby, the brake drum 66 is rotated. The brake drum 66 is then axially moved through the brake cam 71 in the direction approaching to the spool 14. Accordingly, compared to when the operating member 60 is located in the operation starting position, the contact position of the contact part 64*b* of each brake shoe 64 to the taper part 66*b* is shifted toward the large diameter side.

At this time, compared to when the operating member 60 is located in the operation starting position, the pivot angle a of each brake shoe 64 becomes smaller, and the braking force acting on the spool 14 becomes larger. In other words, with an increase in an amount of operation to rotate the operating member 60 from the operation starting position, the pivot angle a of each brake shoe 64 becomes smaller, and the braking force acting on the spool 14 becomes larger.

Finally, when the operating member 60 is set in an operation ending position, the pivot angle a of each brake shoe 64 is minimized, and the braking force acting on the spool 14 is maximized.

It should be noted that the braking force is gradually weakened when the operating member 60 is operated oppositely to the above, i.e., when the operating member 60 is operated from the operation ending position toward the operation starting position.

4-2. Action and Setting of Brake Shoes

Each of the six brake shoes 64 is settable to take either the braking enabling posture or the braking disabling posture. The same setting and the same action are applied to the brake shoes 64, and hence, the explanation thereof will be hereinafter provided by focusing on one of the brake shoes 64.

Firstly, the action of the single brake shoe 64 will be explained. When the rotary member 62 is rotated in conjunction with a rotation of the spool 14 in a condition that the brake shoe 64 is set to take the braking enabling posture, a centrifugal force acts on the center-of-gravity part 64*a* (i.e., the center of gravity G) of the brake shoe 64, and the brake shoe 64 thereby pivots. Accordingly, the brake shoe 64 is contacted to the brake drum 66, and rotation of the spool 14 is braked. Specifically, as depicted with solid line in FIG. 8, the contact part 64*b* of the brake shoe 64 is contacted to the taper part 66*b* of the brake drum 66, and rotation of the spool 14 is thus braked.

It should be noted that the centrifugal force does not act on the center-of-gravity part 64*a* (i.e., the center of gravity G) of the brake shoe 64 when the spool 14 is not being rotated. In this case, as depicted with broken line A, the positioning part 65*a* of the brake shoe 64 is contacted to the outer periphery 86*b* of the relevant shoe holder 86 of the rotary member 62. The state depicted with broken line A in FIG. 8 is the initial posture of the brake shoe 64. In the initial posture, i.e., in a condition that the spool 14 is not being rotated, the center-of-gravity part 64*a* of the brake shoe 64 is restricted from being contacted to the outer periphery of the brake drum 66.

Next, the setting of the single brake shoe 64 will be explained. The brake shoe 64 becomes non-pivotable when a user causes the positioning part 65*a* of the brake shoe 64 to be disposed in the pair of recesses 86*a* of the relevant shoe holder 86 of the rotary member 62 in a condition that the brake shoe 64 takes the braking enabling posture. In other words, the brake shoe 64 is set to take the braking disabling posture. By contrast, the brake shoe 64 becomes pivotable when the user causes the positioning part 65*a* of the brake shoe 64 to get out of the pair of recesses 86*a* of the relevant shoe holder 86. In other words, the brake shoe 64 is set to take the braking enabling posture.

Thus, each of the six brake shoes 64 is arbitrarily settable to either of the braking enabling posture and the braking disabling posture. In other words, the braking force applied to a rotation of the spool 14 can be regulated in accordance with the postural setting taken by each brake shoe 64, i.e., either of the braking enabling posture or the braking disabling posture.

5. Features (1) The present spool brake device 25 is configured to brake the spool 14 rotatably mounted to the reel unit 11 by a centrifugal force. The present spool brake device 25 includes the rotary member 62, the brake drum 66 and the brake shoes 64. The rotary member 62 is configured to be rotated in conjunction with a rotation of the spool 14. The brake drum 66 is disposed in an alignment with the spool 14 along the spool shaft 20, and is mounted to the reel unit 11. Each brake shoe 64 is contactable to the outer periphery of the brake drum 66, and is pivotably supported by the rotary member 62, with the center of gravity G of the brake drum being located radially outside the brake drum 66.

In the present spool brake device 25, each brake shoe 64 is configured to pivot, with the center of gravity G thereof being located radially outside the brake drum 66. Accordingly, the brake drum 66 can be disposed adjacent to the spool 14 in a direction along the spool shaft 20. In other words, even when the spool brake device 25 is mounted to the dual-bearing reel 10, the dual-bearing reel 10 can be produced in an axially small size.

(2) In the present spool brake device 25, it is further preferable that each brake shoe 64 has the pivot center Y (e.g., the axis Y of each pivot shaft 88) located radially outside the brake drum 66.

In this case, in addition to the aforementioned construction, the pivot center Y of each brake shoe 64 is located radially outside the brake drum 66. Hence, the dual-bearing reel 10 can be produced in an axially smaller size.

(3) In the present spool brake device 25, it is further preferable that in pivoting of each brake shoe 64, the center of gravity G of each brake shoe 64 is moved in a range more separating from the spool 14 than the pivot center Y of each brake shoe 64 (e.g., the axis Y of each pivot shaft 88).

In this case, in addition to the aforementioned constructions, the pivot range of the center of gravity G of each brake shoe 64 is always restricted to a range more separating from the spool 14 than the pivot center Y of each brake shoe 64 (the relation "L3>L4" in FIG. 8 is established). Hence, when the centrifugal force acting on the center of gravity G ceases, each brake shoe 64 can be smoothly returned to its initial posture (the posture depicted with broken line A in FIG. 8).

Additionally, each brake shoe 64 can be contacted to a spool 14-side (small diameter-side) position on the brake drum 66 by moving the center of gravity G of each brake shoe 64 in the range more separating from the spool 14 than the pivot center Y of each brake shoe 64. Accordingly, the protruding amount of each brake shoe 64 toward the spool 14 can be reduced. In other words, the dual-bearing reel 10 can be produced in an axially smaller size.

(4) In the present spool brake device 25, it is further preferable that the brake drum 66 includes the taper part 66*b* having a taper shape. Here, it is also preferable that each brake shoe 64 includes the contact part 64*b* to contact the taper part 66*b*. Additionally, it is preferable that the contact part 64*b* contacts the taper part 66*b* from the small diameter side of the taper part 66*b*.

Incidentally, in a well-known art, the contact part 64*b* of each brake shoe 64 contacts the taper part 66*b* from the large diameter side of the taper part 66*b*. In this configuration, there is a possibility that due to an elastic deformation of the contact part 64b of each brake shoe 64 or so forth, the contact position of each brake shoe 64 is shifted to the small diameter side rather than as originally designed. Therefore, the well-known art has had a drawback that a braking force acting on the spool 14 becomes larger than originally designed.

Compared to the well-known art, in the present spool brake device 25, the contact part 64b of each brake shoe 64 contacts the taper part 66b of the brake drum 66 from the small diameter side of the taper part 66b. Accordingly, the dual-bearing reel 10 can be produced in an axially smaller size, and simultaneously, a braking force can be stably produced.

(5) In the present spool brake device 25, it is further preferable that the radial distance L1 between the spool shaft 20 and the center of gravity G of each brake shoe 64 is longer than the radial distance L2 between the spool shaft 20 and the pivot center Y of each brake shoe 64 (e.g., the axis Y of each pivot shaft 88).

In this case, when the centrifugal force acts on the center of gravity G of each brake shoe 64, each brake shoe 64 can be caused to start pivoting about the pivot center Y thereof smoothly and quickly.

(6) In the present spool brake device 25, it is further preferable that the rotary member 62 includes the shoe holders 86 by which the brake shoes 64 are non-pivotably held.

In this case, the brake shoes 64 are non-pivotably held by the shoe holders 86 of the rotary member 62. Hence, the brake shoes 64 can be arbitrarily set to be pivotable or non-pivotable. In other words, the magnitude of a braking force acting on the spool 14 can be arbitrarily changed.

(7) In the present spool brake device 25, it is further preferable that each brake shoe 64 includes the center-of-gravity part 64a in which the center of gravity G is located. Here, it is also preferable that each shoe holder 86 further restricts the center-of-gravity part 64a from being contacted to the brake drum 66.

In this case, when the centrifugal force acting on the center-of-gravity part 64a (e.g., the center of gravity G) of each brake shoe 64 ceases and thereby each brake shoe 64 returns to its initial posture, each shoe holder 86 can restrict the center-of-gravity part 64a from being contacted to the brake drum 66.

(8) In the present spool brake device 25, it is further preferable that the rotary member 62 includes the pivot shafts 88, by which the brake shoes 64 are pivotably supported, and the holes 64c, to which the pivot shafts 88 are fitted.

In this case, the brake shoes 64 can be easily mounted to the rotary member 62 by fitting the pivot shafts 88 to the holes 64c of the rotary member 62.

6. Other Preferred Embodiments

The present invention is not limited to the aforementioned preferred embodiment, and a variety of changes or modifications can be made without departing from the scope of the present invention.

The aforementioned preferred embodiment has explained the example that the brake cam 71 is configured to be moved by the operating member 60 through the first gear part 74 and the second gear part 73. Instead of this, the brake cam 71 can be configured to be moved by the operating member 60 through a cam mechanism. Accordingly, the dual-bearing reel can be produced in an axially smaller size.

What is claimed is:

1. A spool brake device for a dual-bearing reel, the spool brake device configured to brake a spool, rotatably mounted to a reel unit, by a centrifugal force, the spool brake device comprising:
   a rotary member configured to be rotated in conjunction with a rotation of the spool;
   a brake drum disposed in an alignment with the spool along a rotational axis of the spool, the brake drum mounted to the reel unit; and
   a brake shoe contactable to an outer periphery of the brake drum, the brake shoe pivotably supported by the rotary member, with a center of gravity of the brake shoe located radially outside the outer periphery of the brake drum, wherein the brake shoe is configured to be restricted in pivoting such that the center of gravity of the brake shoe pivots in a range more separating from the spool than a pivot center of the brake shoe separates from the spool.

2. The spool brake device according to claim 1, wherein the pivot center is located radially outside the brake drum.

3. The spool brake device according to claim 1, wherein
   the brake drum includes a taper part having a taper shape,
   the brake shoe includes a contact part configured to be contacted to the taper part, and
   the contact part is configured to be contacted to the taper part from a side of the taper part having a smaller diameter than a diameter of an opposing side of the taper part.

4. The spool brake device according to claim 1, wherein a radial distance between the rotational axis of the spool and the center of gravity of the brake shoe is longer than a radial distance between the rotational axis of the spool and the pivot center of the brake shoe.

5. The spool brake device according to claim 1, wherein the rotary member includes a holder by which the brake shoe is non-pivotably held.

6. The spool brake device according to claim 5, wherein
   the brake shoe includes a center-of-gravity part in which the center of gravity is located, and
   the holder further restricts the center-of-gravity part from being contacted to the brake drum.

7. The spool brake device according to claim 1, wherein the rotary member includes a pivot shaft, by which the brake shoe is pivotably supported, and a hole, to which the pivot shaft is fitted.

8. A method of manufacturing a spool brake device for a dual-bearing reel, the spool brake device to brake a spool, rotatably mounted to a reel unit, by a centrifugal force, the method comprising:
   disposing a brake drum in an alignment with the spool along a rotational axis of the spool, the brake drum mounted to the reel unit; and
   pivotably supporting a brake shoe by a rotary member to be rotated in conjunction with a rotation of the spool, the brake shoe contactable to an outer periphery of the brake drum, with a center of gravity of the brake shoe located radially outside the outer periphery of the brake drum, wherein the brake shoe is restricted in pivoting such that the center of gravity of the brake shoe pivots in a range more separating from the spool than a pivot center of the brake shoe separates from the spool.

9. The method according to claim 8, wherein the pivot center is located radially outside the brake drum.

10. The method according to claim 8, wherein
    the brake drum includes a taper part having a taper shape,
    the brake shoe includes a contact part to be contacted to the taper part, and the contact part contacts the taper part from a side of the taper part having a smaller diameter than a diameter of an opposing side of the taper part.

11. The method according to claim 8, wherein a radial distance between the rotational axis of the spool and the center of gravity of the brake shoe is longer than a radial distance between the rotational axis of the spool and the pivot center of the brake shoe.

12. The method according to claim 8, wherein the rotary member includes a holder by which the brake shoe is non-pivotably held.

13. The method according to claim 12, wherein
the brake shoe includes a center-of-gravity part in which the center of gravity is located, and
the holder further restricts the center-of-gravity part from contacting the brake drum.

14. The method according to claim 8, wherein the rotary member includes a pivot shaft, by which the brake shoe is pivotably supported, and a hole, to which the pivot shaft is fitted.

15. A spool brake device for a dual-bearing reel, the spool brake device to brake a spool, rotatably mounted to a reel unit, by a centrifugal force, the spool brake device comprising:

a rotary member to be rotated in conjunction with a rotation of the spool;
a brake drum disposed in an alignment with the spool along a rotational axis of the spool, the brake drum mounted to the reel unit; and
a brake shoe contactable to an outer periphery of the brake drum, the brake shoe pivotably supported by the rotary member, the brake shoe including first disposing means for disposing a center of gravity of the brake shoe radially outside the outer periphery of the brake drum, wherein the brake shoe includes restricting means for restricting the brake shoe in pivoting such that the center of gravity of the brake shoe pivots in a range more separating from the spool than a pivot center of the brake shoe separates from the spool.

16. The spool brake device according to claim 15, wherein the rotary member includes second disposing means for disposing the pivot center of the brake shoe radially outside the brake drum.

17. The spool brake device according to claim 15, wherein the brake drum includes a taper part having a taper shape, and the brake shoe includes means for stably producing a braking force.

* * * * *